March 28, 1939.  J. W. DAWSON  2,151,749

WELDING CONTROL SYSTEM WITH POLARIZING RELAY

Filed Nov. 6, 1937  2 Sheets-Sheet 1

WITNESSES:
CJWeller.
R.W.Bailey

INVENTOR
John W. Dawson.
BY
F.W.Lyle.
ATTORNEY

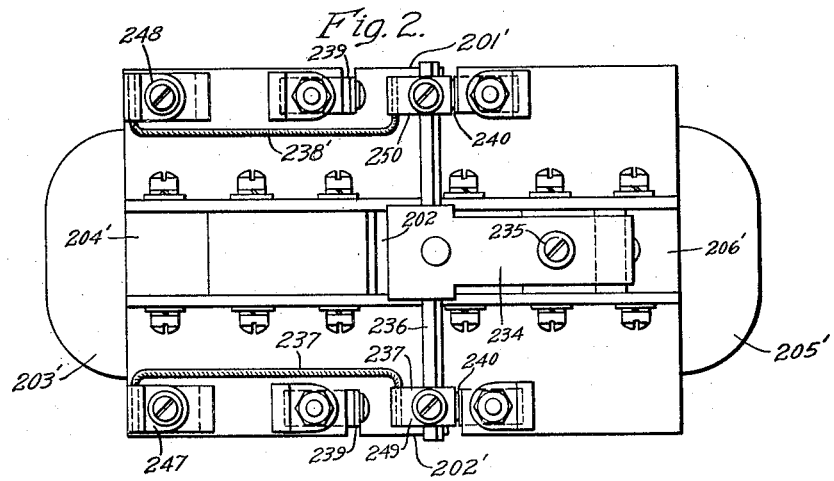

Patented Mar. 28, 1939

2,151,749

UNITED STATES PATENT OFFICE 2,151,749

WELDING CONTROL SYSTEM WITH POLARIZING RELAY

John W. Dawson, East McKeesport, Pa., assignor to Westinghouse Electric & Manufacturing Company, East Pittsburgh, Pa., a corporation of Pennsylvania Application November 6, 1937, Serial No. 173,182

5 Claims. (Cl. 250—27)

My invention relates to means for controlling the application of a predetermined number of half cycles of alternating current to a load circuit, and especially to such application to a welding circuit.

An object of my invention is to prevent saturization of transformers in the load circuit where an odd number of half cycles is periodically applied thereto.

It often happens in the application of a predetermined number of half cycles to a load circuit, such as a welding circuit, that an odd number of half cycles is applied thereto periodically. If these half cycles should, for example, be positive, negative and positive and then repeated with the same sign at necessary intervals, there would be applied to the circuit a preponderance of positive half cycles that would saturate the transformer which is present in these load circuits of the welding type. According to my invention, I provide means to prevent the saturation by ensuring that the weld will start on the helf cycle different in sign from the last half cycle upon which the prior weld was completed. By this means, at the end of any predetermined number of welds utilizing an odd number of half cycles, the load circuit has, at the most, only one more half cycle of one sign applied thereto than the number of half cycles of the opposite sign.

Other objects and advantages of the invention will be apparent from the following description and drawings in which:

Fig. 2 is a top plan view; and

Fig. 3 is a view in side elevation of a preferred type of relay utilized in my invention.

Figure 1:
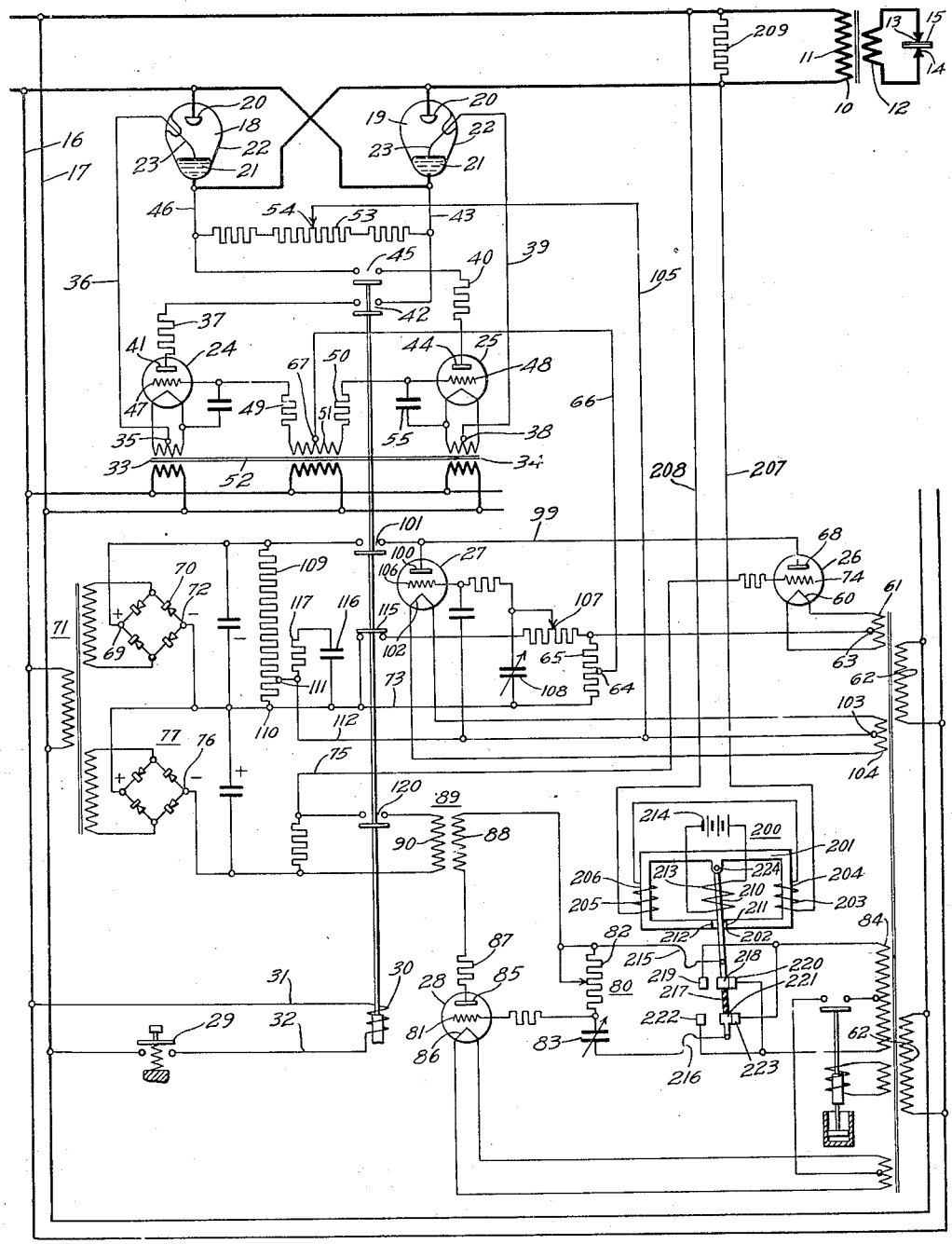
Figure 1 is a diagrammatic circuit disclosing a preferred embodiment of my invention applied to a loading circuit.

I have illustrated the application of my invention to a welding circuit in Fig. 1.

Referring to the figures of the drawings, the reference character 10 designates generally a welding transformer having a primary winding 11 and a secondary winding 12. The secondary winding 12 is connected to the customary welding circuit in which the welding electrodes 13, 14 are diagrammatically represented applied to objects 15 which are to be welded together. The primary winding 11 of the transformer is connected by means of conductors 16 and 17 to a source of alternating current.

In order to control the application of the welding current from the source of alternating current to the transformer 10, vapor electric devices shown generally at 18 and 19 are provided. The devices 18 and 19 are of the mercury vapor type having an anode 20 and a mercury pool 21 as a cathode in the bottom of a container 22. In order to render the vapor electric devices 18 and 19 conducting, a starting electrode 23 is provided.

Although other types of starting electrodes may be utilized, I prefer to use a high resistance electrode immersed in the mercury and composed of carborundum or boron carbide. This type of starting electrode is well known in the art and is more specifically described in Patent 2,069,283, issued February 2, 1937, to Slepian.

The two devices 18 and 19 are disclosed in order that both directions of the alternating current may be controlled in the application to the welding circuit, since each device acts as a rectifier as well as being a controllable conductor.

When a certain amount of current is caused to flow through the starting electrode 23 into the mercury pool 21, a cathode spot is formed which furnishes a source of electrons which, in turn, causes ionization of the mercury vapor within the container 21, and under the influence of positive anode potential, the tube becomes conducting. Thus, it is only necessary to pass sufficient starting current through the starting or ignition electrode 23 to form the cathode spot at a predetermined time in the proper half cycle in the alternating-current wave to render the vapor electric devices conducting for the remainder of that particular half cycle. In order to conduct succeeding half cycles of alternating current, the vapor electric devices 18 and 19 are connected inversely. That is, the anode 20 of device 18 is connected to the cathode 21 of device 19 and the anode 20 of device 19 is connected to the cathode 21 of device 18. It will, therefore, be evident that if the vapor electric devices 18 and 19 are energized in turn during successive half cycles, current from the source of alternating current will flow to the transformer 10 as long as this condition is maintained.

The control system which I prefer to utilize is that described in my copending application for Welding timing circuits, Serial No. 142,564, filed May 14, 1937. It is obvious, however, that my invention is also applicable to the control systems different from that described in this copending application.

The control system, as described in this copending application, involves the utilization of control tubes for supplying ignition current to control the discharge in the tubes 18 and 19 and also electronic devices for accurately operating and stopping the operation of these tubes at predetermined points on the half cycles of alternating current. In the preferred embodiment illustrated, I utilize tubes 24 and 25 for controlling the discharge in the devices 18 and 19 through the igniter or starter 23 and then I utilize a starting tube 26, a cut-off tube 27 for the discharge and in addition for starting the discharge at a predetermined point on the first half cycle of the power period a further tube 28. The application of this control system is preferably instituted by an externally operated switch 29 which may be operated manually or by a cam on the welding machine. In other words, when the operator desires to perform the welding operation, he depresses the switch 29, energizing the relay 30 from the conductors 31, 32 connected to the source of alternating current. The relay 30, in turn, operates various individual switches hereinafter referred to in the description of the control circuit.

The cathodes of the tubes 24 and 25 are energized from the alternating circuit by transformers 33 and 34, respectively. The midpoint of the secondary of the transformer 33, namely 35, has a connection 36 extending to the starting electrode 23 of tube 18. Likewise, the midpoint 38 of the secondary of transformer 34 is connected through connection 39 to the starting electrode 23 of the tube 19. The anode 41 of tube 24 is connected through resistance 37 and switch point 42 of the starting relay 30 to the connection 43 to the anode 20 of tube 18. The anode 44 of tube 25 is likewise connected through resistance 40 and switch 45 of the relay 30 to the connection 46 to the anode 20 of tube 19. The grids 47 and 48 of tubes 24 and 25 are connected through suitable resistances 49 and 50 to opposite ends of the secondary 51 of transformer 52 connected to the source of alternating current. The grids and cathodes of tubes 24 and 25 may be energized from secondary windings on the same transformer instead of the individual transformers disclosed. Between the conductors 43 and 46 extending to the cathodes and anodes of the tubes 18 and 19 previously described is a resistance 53. The variable tap 54 on this resistor is to compensate for any slight difference between the tubes 18 and 19 in operation. The further function of this resistance 53, together with the transformer winding 51, connecting the grids and cathodes of the tubes 24 and 25 is to nullify the alternating-current potential which would otherwise exist on the grids 47 and 48 of tubes 24 and 25 because of their circuit locations.

Tube 26 is utilized as a starting device. Its cathode 60 is energized through the transformer of secondary 61 of transformer 62 and the midpoint 63 of this secondary is connected through resistance 65, its midpoint 64 and connections 66 to the midpoint 67 of the transformer secondary 51 connected to the grids 47 and 48 of the tubes 24 and 25. The anode 68 of tube 26 is connected to the positive terminal 69 of a source of direct-current potential disclosed as the rectifier grid 70 connected to a transformer 71 energized from the source of alternating current. The negative terminal 72 is connected through conductor 73 to the resistance 65, cathode transformer secondary 61 and cathode 60. The grid 74 of tube 26 is connected through a connection 75 to the negative terminal 76 of a similar rectifier bridge 77 also energized by the alternating-current source. These rectifier bridges are preferably of the well-known copper-oxide dry plate type. The negative potential from the rectifier bridge 77 on the grid 74 constitutes a discharge preventing bias normally applied to the control electrode of the starting tube 26.

The operation of the starting tube 26 is controlled by means of the timing tube 28 previously referred to which controls the point of initiation of tube 26 with respect to the voltage wave. This timing tube 28 is preferably of the hot-cathode gaseous discharge type and is provided with a phase-shifting control circuit 80 for the grid 81 of the tube. This phase-shifting control circuit comprises an adjustable resistor 82 and an adjustable capacitor 83. The phase-shifting circuit 80 is connected by means of a transformer 84 to the same source of alternating current as is applied to the anode 85 and cathode 86 of the timing tube 28. Alternating current for the timing tube 28 is provided from windings on the secondary of transformer 84. The output of timing tube 28 is applied to a circuit comprising the resistor 87 and a winding 88 of a transformer 89. The secondary winding 90 of the transformer 89 is indirectly connected to the grid 74 of the starting tube 26 when the switch 120 of relay 30 is closed through the connection 75 which, as previously described, normally applies a negative discharge preventing potential to this grid 74.

The phase-shifting circuit 80 is adjusted by means of the variable resistor 82 and variable capacitor 83 to render the start tube 26 conducting at the desired point in the cycle of operation of the alternating-current source. The phase-shifting circuit 80 will determine the exact point on the voltage wave that the tube 28 will be rendered conducting. The discharge in tube 28 permits current to flow through the primary winding 88 of transformer 89, and due to the steep wave front of the current applied, a sharp voltage surge will appear in the secondary winding 90 which will be applied, in turn, to the grid 74 of the starting tube 26. The peak value of the surge is sufficient to overcome the negative potential of the source 77 and to positively bias the grid 74, thereby rendering the start tube 26 conducting. As soon as the start tube 26 becomes conducting, a positive potential is applied to the control tubes 24 and 25 and they will then function to establish the conductivity of tubes 18 and 19.

It will be noted that the cut-off space discharge device 27 has its anode 100 connected through switch 101 to the same positive terminal of the rectifier bridge 70 as the anode 68 of the starting tube 26. The cathode 102 of the cut-off tube 27 is connected through the midpoint 103 of the transformer secondary 104 by means of a connection 105 to the midpoint 54 of the resistance 53 across the anodes and cathodes of the tubes 18 and 19. The grid 106 of cut-off tube 27 is connected through adjustable resistance 107 to the cathode 60 of the starting tube 26, an adjustable timing condenser 108 is connected to the cathode circuit 63, cathode 60 of the starting tube 26 and conductor 73 extending from the negative terminal of the direct-current rectifier bridge 70 to the resistance 65. The resistance or voltage divider 109 extends from the connection 99 between the anodes of tubes 26 and 27 to the point 110 on the conductor 73 connected to the grid 106 of tube 27. A tap 111 is taken from a point on the potentiometer and by means of connection 112 is applied to the cathode 102 of the cut-off tube 27. It will be noted that the point 110 with respect to 111 corresponds to the negative grid potential of the cut-off tube 27. The point 111 corresponds to the cathode potential of the tube 27.

The conduction of the tube 26 will apply potential across the resistor 65 and this potential acts to charge the condenser 108 through the variable resistance 107. After a time variable between adjustment of resistor 107, condenser 108 is sufficiently charged to raise the grid 106 of tube 27 to its breakdown point with respect to its cathode 102. With the breakdown of this tube positive, potential is fed through the tube and its cathode transformer to wire 105 which action again throws the bias on control tubes 24 and 25 to a negative value, stopping the further ignition of the tubes 18 and 19 and hence further welding currents after the termination of the particular half-cycle. Leads 66 and 105 are the timing circuit output leads.

When neither tube 26 nor 27 is ignited, the lead 66 is negative to lead 105. When the starting tube 26 discharges, the lead 66 becomes positive and the lead 105 becomes negative. When the stop tube ignites, the lead 66 again becomes negative in respect to the lead 105. During the period while lead 66 is positive in respect to lead 105, welding current can flow.

The weld has, accordingly, been completed by the automatic operation of tubes accurately timing the predetermined number of half cycles of alternating current. No manual operation by the operator in connection with the control circuit is necessary after the work 15 is in position, except for the depression of the manual switch 29. The sequence of the switches operated thereby is first, switch 101 to energize rectifiers 70 and 77, then switches 45 and 42 together and then switch 120. After the weld has been completed, the pressure is released from switch 29 and the various switches operated by relay 30 will be released in reversed order, namely, switches 120, 42 and 45 and then switch 101, but the connection at switch 115 will be made to discharge the timing condenser 108 and have it ready for the next operation.

It will be noted that both the negative component of the timing voltage applied to tube 27, i. e., between points 110 and 111, and the positive component of timing voltage, i. e., the voltage across condenser 108, are derived from the same source 70, and, accordingly, variations in this source due to changing of temperature or other causes will equally effect the positive and negative components of grid voltage as applied to tube 27, and will not change, therefore, the accuracy of timing following the discharge of tube 26.

Various condensers and resistances are, of course, illustrated at desired places in the apparatus, some of which, as at 116 and 117, acting as filters.

My invention contemplates reversing when necessary the application of the secondary coil 84 to the tube 28, which tube determines the starting point of the application of the welding power at the predetermined point of the initial half cycle. This reversing means I have disclosed as a relay 200 which preferably has a permanent magnet 201 with an air gap 202 inserted between two of its extended arms or legs. A coil 203 is placed about one of the legs 204 of the magnet and another coil 205 is placed around the other leg 206 of the magnet. These coils are connected in series and are connected by conductors 207 and 208 to be associated with the main welding power circuit feeding the welding transformer 10. This association may take the form of the direct connection to the alternating-current mains as disclosed, with a suitable resistance 209 thereacross, or may take place with a current transformer or any other suitable means, as desired.

An armature 210 plays back and forth in the air-gap 202 between the faces 211 and 212 of the permanent magnet in response to the influence of the magnetization of the coils 203 and 205 about the legs of the magnet. A direct-current coil 213 is placed about this armature and is fed with suitable direct current from a source 214 to maintain a constant polarity of the armature. The armature has a connection 215 extending to the anodes 85 of tube 28 and another connection 216 extending to the grid circuit of tube 28. These two connections are, of course, insulated from each other by insulation 217 on the armature.

The contact 218 alternately connects the anode connection 215 to the contact 219 attached to the upper end of coil 84 and then to contact 220 connected to the lower end of coil 84. The contact 221 on the armature having electrical connection with conductor 216 connected to the grid 81 of the tube 28, is alternately connected to contact 222 connected to the lower end of coil 84 and then to contact 223 connected to the upper end of coil 84. This relay is disclosed with the armature pivoted at 224.

In Figs. 2 and 3 are disclosed actual elevational views of a preferred type of device to utilize for the relay. The permanent magnet circuit is designated with a base 201' and arms 204' and 206' having extensions forming air-gaps 202'. The coils 203' and 205' are placed about these arms and the direct-current coil 213' is also disclosed. The armature preferably is composed of two members 230 and 231 pivoted one on the other at 232 in a toggle arrangement. The lower member 230 is preferably pivoted by a knife edge into a fixed groove at 233. The upper member 231 of the armature is held on a spring member 234 having turned-over edges holding a block 246 with a V-shaped notch therein for the upper pointed edge of armature 231. The tension on armature 231 is regulated by the spring and nut assembly 235. Attached to the lower part of the armature 231 there is a bar 236 which, in turn, supports the contact members 243 and 244. Flexible leads 237 and 238 from terminals 247 and 248 extend to terminals 249 and 250 extending to contacts 243 and 244. These flexible leads 237 and 238 correspond to the flexible leads disclosed at 215 and 216 in Fig. 1.

The contacts 219 and 220 in Fig. 1 are preferably constructed as spring members 239 and 240 disclosed in Fig. 3 having contact faces 241 and 242. Attached to the armature 231 is a contact face 243 to make contact with contact 241 and another contact 244 to make contact with contact 242.

A duplicate set of these spring members and contacts at the opposite or back part of the relay constitutes the contacts 221, 222 and 223 disclosed in Fig. 1. The adjustment of the spring and nut member 235 will ensure the positive connection between the armature and the contact faces on the spring members 239 and 240.

The operation of the device is as follows: It will be assumed that the connections are such that when the armature 210 in Fig. 1 makes contact with contacts 219 and 222, the cycle will start on a positive half cycle, and when the armature is in contact with contacts 220 and 223 the weld starts with a negative half cycle. The coils 203 and 205 about the relay are such that when the weld ends on a positive half cycle, the pole of the armature 210 in the airgap 202 is north and the pole face 212 is a south pole. The direct-current coil 213 is also arranged so that the armature is a south pole in the airgap 202.

We assume that the load has been applied for an odd number of half cycles and has started on a positive half cycle. This means, of course, that the weld ends on a positive half cycle and the pole 211 is a north pole. During the operation of the weld, the positive and negative half cycles have succeeded one another too rapidly to move the armature. When the weld ends, however, the north pole of 211 will attract the south pole of the armature and the armature will be pulled into the position disclosed in Fig. 1 to the contacts 220 and 223. There will be an off interval and then with the contacts on 220 and 223, the next weld will start on a negative half cycle because the connections to the tube 28 are such that the weld will start on the negative half cycle with these contacts as previously stated. The weld will end on a negative half cycle because the timing mechanism has been set for an odd number of half cycles and the pole piece 211 will become a south pole when the weld ends negative, and this south pole will repel the south pole of the armature so that the armature will be repelled when the weld ends and the armature will also be attracted by north pole 212 into contact with contacts 219 and 222 during the rest interval. When the timing mechanism is actuated again, it will start the weld on a positive half cycle because of this new position of the armature. Accordingly, during these three welds the start and stop of the weld has been first a positive half cycle, then a negative, and then a positive half cycle. The next weld, of course, would start on a negative half cycle and end on a negative half cycle. According to my invention, this arrangement prevents a preponderance of half cycles of one sign or the other, and there will be no saturization of the transformer 10 or any other similar effect in the load circuit.

In case the timing mechanism is set for an even number of half cycles, the armature will remain in one position during both the interval and during the weld itself. My invention thus does not have to be disturbed in any way when an even number of half cycles is utilized.

The direct-current source 214 for the direct-current coil 213 may, instead of the battery disclosed, be derived from one of the rectifier bridges, such as 70 or 71. This construction has the advantage that the direct current will be interrupted during the off interval and electrical energy conserved.

It is apparent that many modifications may be made in the form, arrangement and number of the elements and circuits disclosed in the drawings without departing from the spirit of the invention. Accordingly, I desire only such limitations to be imposed upon the following claims as are necessitated by the prior art.

I claim as my invention:

1. In combination, a load circuit and an alternating-current supply circuit, means applying a predetermined odd number of half cycles from said supply circuit in successive intervals to the load circuit and electrical means for always applying an initial half cycle differing in sign from the final half cycle of the preceding interval.

2. In combination, a load circuit and an alternating-current supply circuit, means applying a predetermined number of half cycles from said supply circuit in successive intervals to the load circuit, an electric discharge device determining the time of conductive connection of the supply circuit to said load circuit, a control circuit for said device connected to said supply circuit, and means connected to the load circuit side of said device for reversing the polarity of the last-mentioned connections to initiate the application of a load current in each said interval at a half cycle of opposite sign to the final half cycle of the preceding interval.

3. In combination, a load circuit and an alternating-current supply circuit, means applying a predetermined number of half cycles from said supply circuit in successive intervals to the load circuit, control means connected to said supply circuit for predetermining the time of initiation of the application of the supply current to the load circuit and means for reversing the connections of said control means to said supply circuit for making the initial half cycle of one interval of different sign than the final half cycle of the preceding interval.

4. In combination, a load circuit and an alternating-current supply circuit, means applying a predetermined number of half cycles from said supply circuit in successive intervals to the load circuit, means predetermining the initiation of the application of the supply current to the load circuit and electrical means including a reversing switch connected to said last-mentioned means and actuated by said load circuit for making the initial half cycle of one interval of different sign than the final half cycle of the preceding interval.

5. In combination, a load circuit and an alternating-current supply circuit, means applying a predetermined number of half cycles from said supply circuit in successive intervals to the load circuit, means predetermining the initiation of the application of the supply current to the load circuit and electrical means connected to said last-mentioned means and actuated by said load circuit for making the initial half cycle of one interval of different sign than the final half cycle of the preceding interval including a reversing switch comprising a permanent magnet having two legs forming opposite poles across an air gap, coils on said legs connected to said alternating supply circuit, a magnetizable armature having a fixed pole in said air gap and reversing contacts actuated by said armature, said contacts being connected to the means determining the initiation and application of the half cycles to the load circuit.

JOHN W. DAWSON.